(12) United States Patent
Marin et al.

(10) Patent No.: US 8,484,466 B2
(45) Date of Patent: Jul. 9, 2013

(54) SYSTEM AND METHOD FOR ESTABLISHING BEARER-INDEPENDENT AND SECURE CONNECTIONS

(75) Inventors: Janne Marin, Espoo (FI); Kari Kostiainen, Helsinki (FI); Nadarajah Asokan, Espoo (FI); Seamus Moloney, Riihimäki (FI); Philip Ginzboorg, Espoo (FI); Javier Lafuente, Madrid (ES)

(73) Assignee: Nokia Corporation, Espoo (FI)

( * ) Notice: Subject to any disclaimer, the term of this patent is extended or adjusted under 35 U.S.C. 154(b) by 603 days.

(21) Appl. No.: 11/575,967

(22) PCT Filed: Nov. 16, 2006

(86) PCT No.: PCT/IB2006/003247
§ 371 (c)(1),
(2), (4) Date: Sep. 18, 2009

(87) PCT Pub. No.: WO2007/057758
PCT Pub. Date: May 24, 2007

(65) Prior Publication Data
US 2009/0327713 A1    Dec. 31, 2009

Related U.S. Application Data

(60) Provisional application No. 60/737,117, filed on Nov. 16, 2005.

(51) Int. Cl.
H04L 29/06    (2006.01)

(52) U.S. Cl.
USPC ............. 713/168; 380/33; 380/247; 380/249

(58) Field of Classification Search
USPC ............. 713/168; 380/33, 247–249; 455/410
See application file for complete search history.

(56) References Cited

U.S. PATENT DOCUMENTS

2003/0033518 A1*  2/2003  Faccin et al. ................. 713/153
2004/0111494 A1   6/2004  Kostic et al.

(Continued)

FOREIGN PATENT DOCUMENTS

EP    1365561 A1    11/2003
EP    1487224 A1    12/2004

(Continued)

OTHER PUBLICATIONS

Office Action for Chinese Patent Application No. 200680049331.8, dated Mar. 23, 2011.

(Continued)

*Primary Examiner* — Justin T Darrow
(74) *Attorney, Agent, or Firm* — Banner & Witcoff, Ltd.

(57) ABSTRACT

A system and method for efficiently enabling local security connectivity between electronic devices over multiple bearers. Electronic devices are configured to advertise, over each bearer, their respective configuration parameters for each bearer. After a connection has been established between the electronic devices over a first bearer, the two electronic devices use the first bearer to establish connections over the other bearers using the configuration parameters contained in the advertisements and advertised over the first bearer. Shared keys are established for the other bearers either using keys derived from the first shared key or by using the first secure connection as an out-of-band channel. The present invention also provides for the creation of an ad hoc WLAN connection once a Bluetooth connection has been established.

28 Claims, 5 Drawing Sheets

U.S. PATENT DOCUMENTS

| | | | |
|---|---|---|---|
| 2005/0003822 A1 | 1/2005 | Aholainen et al. | |
| 2005/0037733 A1* | 2/2005 | Coleman et al. | 455/411 |
| 2005/0164634 A1* | 7/2005 | Tanaka et al. | 455/41.2 |
| 2005/0266798 A1* | 12/2005 | Moloney et al. | 455/41.2 |
| 2006/0045267 A1* | 3/2006 | Moore et al. | 380/247 |
| 2007/0066307 A1* | 3/2007 | Brown et al. | 455/445 |

FOREIGN PATENT DOCUMENTS

| | | |
|---|---|---|
| JP | 2004112225 A | 4/2004 |
| WO | WO 03003610 | 1/2003 |
| WO | WO 2007019877 | 2/2007 |

OTHER PUBLICATIONS

English Translation of Office Action for Chinese Patent Application No. 200680049331.8, dated Mar. 23, 2011.
Personal Area Networking Profile, Bluetooth SIG Confidential, p. 1-65, Feb. 14, 2003.
International Search Report for PCT Application PCT/IB2006/003247.
Supplementary European Search Report for EP Patent Application No. 06820906.3, dated Jun. 8, 2011.
"Personal Area Networking Profile", XP003012348, Internet Citation, Jan. 14, 2003.

* cited by examiner

SYSTEM AND METHOD FOR ESTABLISHING BEARER-INDEPENDENT AND SECURE CONNECTIONS

FIELD OF THE INVENTION

The present invention relates generally to the establishment of local connections between electronic devices. More particularly, the present invention relates to the sharing of available bearer information for connectivity purposes between local devices.

BACKGROUND OF THE INVENTION

Bluetooth, Wireless Local Area Network (WLAN) and Ultra Wideband (UWB) represent radio technologies which are becoming increasingly popular in mobile devices. Establishing a secure connection between two devices using one of these technologies or bearers requires that a shared secret be established between the two devices. When the shared secret is in place, the link is secure because a session key derived from the shared secret can be used to encrypt data sent over the created link. The procedure for the establishment of a shared secret is critical and currently differs between the bearers.

Additionally, Bluetooth and WLAN are two different technologies that can be used to create IP ad-hoc networks. Ad-hoc networks are becoming increasingly important in mobile devices. Bluetooth Personal Area Networking (PAN) is the Bluetooth Profile used to transmit IP packets over Bluetooth links. Bluetooth PAN enables the creation of ad-hoc networks. Bluetooth Network Encapsulation Protocol (BNEP) is defined as part of Bluetooth PAN Profile. PAN Profile describes how to use Bluetooth Service Discovery Protocol (SDP) to discover the PAN capabilities of other devices. Ad-hoc WLAN is the operation mode of WLAN where no access point is used and devices communicate directly forming and ad-hoc network. Bluetooth PAN and ad-hoc WLAN are totally independent of each other and are alternative technologies which can be used for the same purpose. However, Bluetooth PAN and ad-hoc WLAN have very different characteristics. An increasing number of mobile devices are beginning to support both technologies.

In part because of the constantly increasing number of options available on mobile devices, users often become confused by the number of options their mobile devices offer for short range connections. The differences between systems such as WLAN and Bluetooth are often a mystery to the average user. Additionally, in the case of forming ad-hoc networks, Bluetooth PAN and WLAN need different mechanisms and different user interfaces to setup an ad-hoc network. Currently, this is very difficult for ad hoc WLAN. Furthermore, WLAN currently does not support the discovery of nearby devices (as Bluetooth does), because WLAN radio is normally turned off due to its high level of power consumption.

As more bearer technologies, such as UWB based Wireless universal serial bus (Wireless USB) or WiNet, get added to devices, this confusion is likely to worsen. In addition to users not understanding the meaning of the different bearers, the fact that security must be configured differently for each bearer means that the configuration step is often skipped altogether. This results in confusion and can lead to security problems in the field. These problems result directly from the fact that the procedures for establishing secure short range links between devices are non-uniform for different bearers. For example, a likely user scenario involves a user wanting to send a picture to his or her friend's device, with the friend standing nearby. Both users have phones equipped with both Bluetooth and WLAN, but neither person knows which of these systems are currently active for the other person's device. The result can often be that the two devices fail to find each other, and the two users ultimately lose faith in the entire feature. If the two users do ultimately succeed in finding each other's devices, they may only send the picture from one device to the other while avoiding the extra effort of trying to make the link a secure link due to the additional complexity that is involved.

SUMMARY OF THE INVENTION

The present invention involves a system and method for providing significant amounts of information between devices which is shared so in order to configure multiple secure wireless links between the devices at the same time, thus saving significant amounts of effort on the part of the participating end users. The present invention enables both the establishment of connections over multiple bearers, as well as ensuring that these various connections comprise secure connections.

With the present invention, users do not need to worry about bearer-specific details. The user can take advantage of all of the different bearers that are common to the two devices at issue without having to separately configure each bearer. The usability of short range connections can also be improved with the present invention. If one link between two devices (e.g. out of Bluetooth range) does not work, the present invention makes it easy to switch to another bearer (e.g., WLAN) as an alternative method for communicating with the other device. Another advantage of the present invention is that the connections being configured may also comprise wired connections. For example, Internet protocol security (IPSEC) or pre-shared key TLS (PSK-TLS) connections can be configured between the devices, and these connections may be usable over the internet.

The present invention also provides for an ad-hoc set up mechanism for devices supporting both Bluetooth and WLAN. The network setup is started as a standard Bluetooth PAN ad-hoc network set-up. When a device supporting WLAN is retrieving the supported PAN roles of another device using SDP, it will also check if the other device supports ad-hoc WLAN. If both devices support ad-hoc WLAN, a new message called WLAN_SETUP_CONNECTION_REQUEST_MSG will be sent. This message contains the ad-hoc WLAN network identifier (SSID) and a WEP key, and the device sending this message will immediately create such an ad-hoc network and wait for the receiver(s) of the message to join it.

These and other advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF THE PREFERRED EMBODIMENTS

Figure 1:
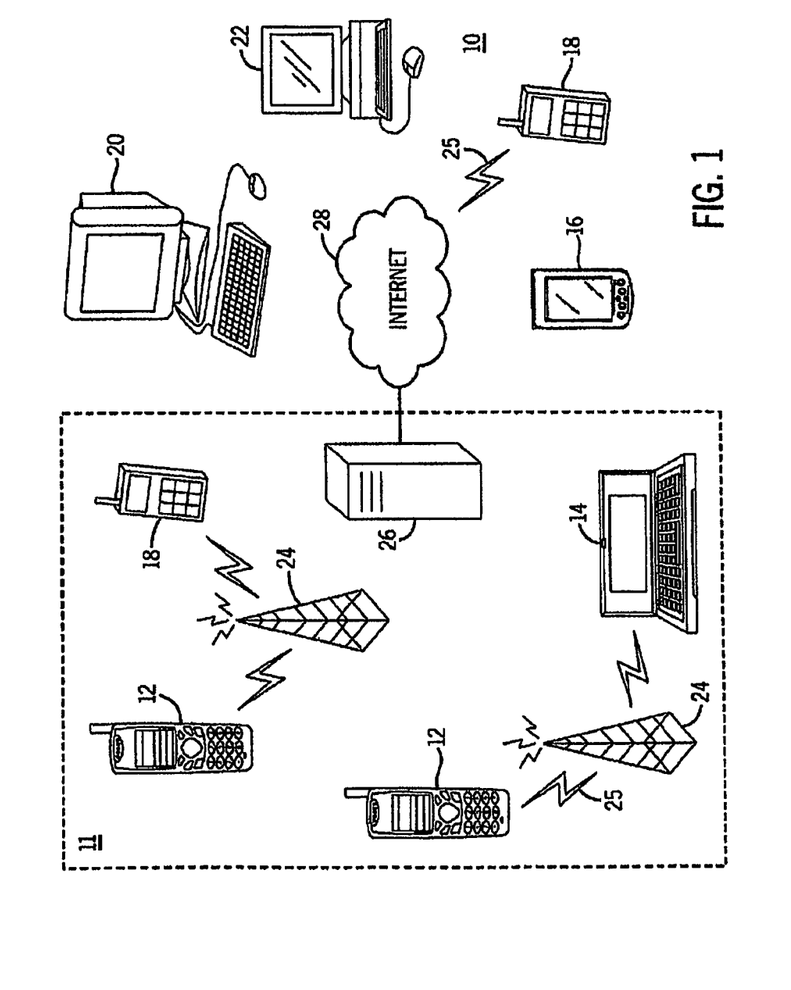
FIG. 1 is a representation of a system within which the present invention may be implemented.

FIG. 1 shows a system 10 in which the present invention can be utilized, comprising multiple communication devices that can communicate through a network. The system 10 may comprise any combination of wired or wireless networks including, but not limited to, a mobile telephone network, a wireless Local Area Network (LAN), a Bluetooth personal area network, an Ethernet LAN, a token ring LAN, a wide area network, the Internet, one or more ad-hoc networks between communication devices, etc. The system 10 may include both wired and wireless communication devices.

For exemplification, the system 10 shown in FIG. 1 includes a mobile telephone network 11 and the Internet 28. Connectivity to the Internet 28 may include, but is not limited to, long range wireless connections, short range wireless connections, and various wired connections including, but not limited to, telephone lines, cable lines, power lines, and the like.

The exemplary communication devices of the system 10 may include, but are not limited to, a mobile telephone 12, a combination PDA and mobile telephone 14, a PDA 16, an integrated messaging device (IMD) 18, a desktop computer 20, and a notebook computer 22. The communication devices may be stationary or mobile as when carried by an individual who is moving. The communication devices may also be located in a mode of transportation including, but not limited to, an automobile, a truck, a taxi, a bus, a boat, an airplane, a bicycle, a motorcycle, etc. Some or all of the communication devices may send and receive calls and messages and communicate with service providers through a wireless connection 25 to a base station 24. The base station 24 may be connected to a network server 26 that allows communication between the mobile telephone network 11 and the Internet 28. The system 10 may include additional communication devices and communication devices of different types. The communication devices may communicate directly between each other.

The communication devices may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device may communicate using various media including, but not limited to, radio, infrared, laser, cable connection, and the like.

Figure 2:
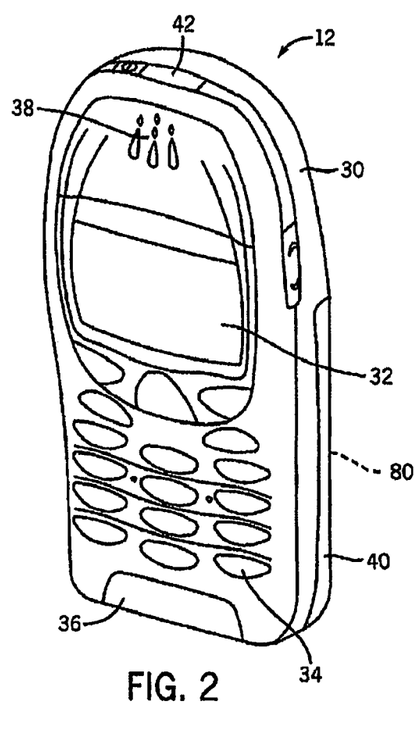
FIG. 2 is a perspective view of a mobile telephone that can be used in the implementation of the present invention.
Figure 3:
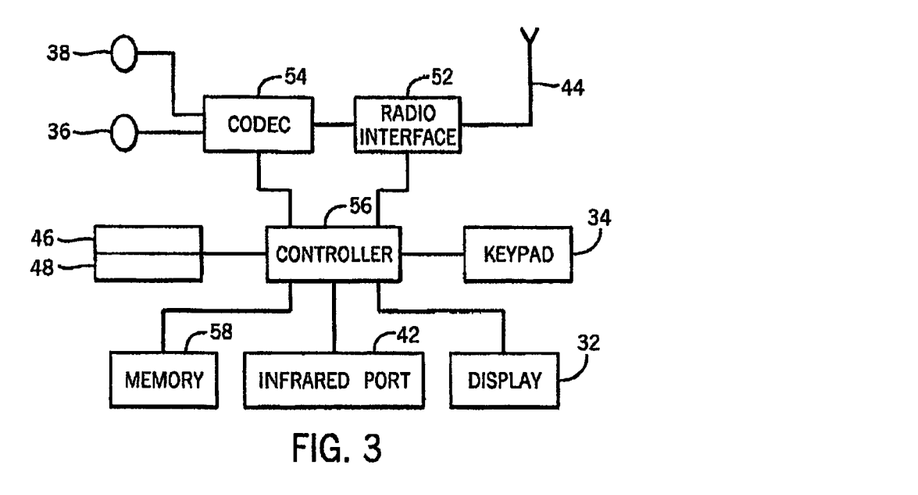
FIG. 3 is a schematic representation of the telephone circuitry of the mobile telephone of FIG. 2.

FIGS. 2 and 3 show one representative mobile telephone 12 within which the present invention may be implemented. It should be understood, however, that the present invention is not intended to be limited to one particular type of mobile telephone 12 or other electronic device. The mobile telephone 12 of FIGS. 2 and 3 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment of the invention, a card reader 48, radio interface circuitry 52, codec circuitry 54, a controller 56 and a memory 58. Individual circuits and elements are all of a type well known in the art, for example in the Nokia range of mobile telephones.

The present invention provides a system and method for sharing information about available bearers in the devices with which a user wishes to connect, as well as an approach for configuring security parameters for each of the respective bearers. For example, if a user wishes to make a secure connection between his or her mobile telephone and his or her personal computer, the system and method of the present invention ensures that, if both devices support both Bluetooth and WLAN, then secure connections are configured for both of these bearers. Because it is usually not known ahead of time which of these bearers will be active in each device, the invention involves, as part of the secure link setup, the transmission of advertisements on each of the bearers about the availability and configuration information for all supported bearers. Therefore, the first bearer that is found will be the bearer used to establish a connection between the devices and to configure security associations for all bearers. A link key is established on the found bearer using a standard key agreement protocol, such as the conventionally known Diffie-Hellman protocol. This link key is used to derive a key for the other bearers (e.g., WLAN). A widely used and reliable pseudo random function (prf) which could be used for the purpose of this derivation is a keyed hash such as HMAC-SHA-1 (Hash-based Message Authentication Code (HMAC) computed using the SHA1 hash function, as described in RFC 2104. For example, the procedure for deriving a key for a bearer would comprise using the shared secret as a key to the prf and applying it to a string which would describe that particular bearer. For example, assuming a Diffie Hellman secret KDK (Key-Derivation Key) had been established on one bearer, other link keys could be derived:

Bluetooth Link Key=first 128 bits of HMAC-SHA1$_{KDK}$ ("Bluetooth")

WLAN Link Key=first 256 bits of HMAC-SHA1$_{KDK}$ ("WLAN")

Wireless USB Link Key=first 256 bits of HMAC-SHA1$_{KDK}$("Wireless USB")

The exact key derivation function that is used may be different but will conform to the general principles that (a) it is derived using a procedure that takes the KDK and other mutually known information as input, (b) the procedure used is one-way, so that knowing a resulting link key will not provide any information about the KDK used to derive it, and (c) the resulting link keys appear independent from one another, so that knowing one link key will not provide any information that helps in calculating any other link key without knowing the original KDK. Software in both devices is capable of configuring the non-active bearer with the derived link key so that the user can seamlessly use WLAN between the two devices at a later date without the need to make another pairing between the devices.

Two issues govern the implementation of the present invention. The first issue involves how the devices advertise to each other about the bearers they support. The second issue involves how the devices proceed to configure the security parameters for those bearers. If two devices communicate using Bluetooth, they can allow each other to know that they are capable of running WLAN as well by advertising this fact using the Service Discovery Protocol, which is a feature of Bluetooth. In such a situation, the devices can create or have an existing SDP record in the SDP database. In one embodiment of the invention, the SDP record consists of three elements. The first element is the bearer type, which is an integer to represent WLAN. The second element is the media access control (MAC) Address of the WLAN hardware in the device. The third element is the default SSID name that would be used. It should be noted that there can several different SSID's, comprising default and secondary SSIDs which may be utilized in an order of priority. Other devices could find this device using Bluetooth and, even though WLAN was not actually active at the time, an SDP query could be used to determine that the device in question supported WLAN and how to connect to the device.

Similarly, if the devices had WLAN active at the time of the connection initiation, the devices would advertise to each other that they supported Bluetooth by placing the following fields in the Probe requests which are sent over WLAN: (1) the bearer type—an integer to represent Bluetooth; (2) the MAC address of the Bluetooth hardware; and (3) a Bluetooth-friendly name in use at that device. Wireless USB also support this type of functionality in a similar manner in one embodiment of the present invention. It should also be noted that beacons and signalling may be used instead of Probe requests.

The following are examples of the types of bearer-related information that may be used in the establishment of a communication link between a first electronic device and a second electronic device according to the principles of the present invention. In order to establish such a connection, basic information is required from each bearer. Table 1 below describes general information which is required in this situation.

TABLE 1

| Parameter type | Number of bits per field | Parameters |
| --- | --- | --- |
| Supported bearers | 1 B | Supported bearers WLAN, Bluetooth, WUSB, WiNET, . . . |
| Supported association models | 1 B | Numeric model, PIN, Near Field Communication (NFC) interface, NFC token, . . . |

Table 2 identifies the parameters that are required to enable the establishment of a WLAN connection.

TABLE 2

| Parameter type | Number of bits per field | Parameters |
| --- | --- | --- |
| SSID | 32 B | Network identifier |
| BSSID | 6 B | MAC Address |
| Capablities | 2 B | Access capabilities 802.11 a, b, g . . . |
| Channel | 2 B | Used channel characteristics 2.4 GHz/5 GHz |
| Authentication type | 1 B | None, Wired Equivalent Privacy (WEP), WPA_PSK, WPA, . . . |

In the case of the BSSID, which stands for "basic service set identifier," this parameter is used to help uniquely identify the device, while at the same time protecting the privacy of the respective device. For example, the use of a BSSID can help prevent MAC address tracking. In another embodiment of the invention, the BSSID parameter is not used.

Table 3 identifies the parameters that are required to enable the establishment of a WUSB connection.

TABLE 3

| Parameter type | Number of bits per field | Parameters |
| --- | --- | --- |
| DID | 4 B | Device identifier CHID/CDID |
| Channel | 1 B | Used band groups |
| HostFriendlyName | 0 B-64 B | User FriendlyName |

Table 4 identifies the parameters that are required to enable the establishment of a WiNet connection.

TABLE 4

| Parameter type | Number of bits per field | Parameters |
| --- | --- | --- |
| EUI address | 6 B | MAC address |
| DevID | 2 B | Device Address |
| Channel | 1 B | Band group |

Table 5 identifies the parameters that are required to enable the establishment of a Bluetooth connection.

TABLE 5

| Parameter type | Number of bits per field | Parameters |
| --- | --- | --- |
| BD_ADDR | 6 B | Bluetooth device address |
| Bluetooth (BT) short name length | 1 B | Length of user friendly name |
| BT short name | 0 B-255 B | User friendly name |
| BT class of device | 3 B | BT class of device |

The parameter information discussed above must be exchanged between devices in order for the appropriate connection to be established. This exchange process can occur using currently available mechanisms in different bearers. Therefore, although the actual mechanisms are different in each bearer, the end result is results the same.

Information can be conveyed between devices in several ways. These include, for example, adding new messages to the specification, adding new information elements to existing messages, utilizing existing extension mechanisms in existing messages or using another protocol, such as UPnP over bearers that are handling message exchange after a connection has been established and secured. Each of these methods has its own advantages, as will be understood by those skilled in the art.

In a WLAN situation, Probe Request and Probe Response messages are suitable for sending bearer-related information. The WLAN specification allows for vendors to add Information elements to these WLAN messages, and as each Information element can hold up to 255 bytes of information, there is sufficient space to add the information related to each bearer needed for the present invention In a Bluetooth situation, service discovery protocol (SDP) is suitable for sending bearer-related information. In a WiNet situation, a new information element may be defined for transmission in a beacon, or information may be sent using Application Specific Information Elements (ASIE) defined in WiNet MAC. ASIEs are sent, if specified and used, in beacons and may contain any application data. Only ASIE specifier ID has to be requested from WiNet. The maximum length of ASIE is 255 B, which restricts the data amount to be sent in this case.

In a WUSB situation, a new information element is defined, as WUSB does not currently have any extension mechanism available for this purpose. In a cable association model, GET_ASSOCIATION_INFORMATION and SET_ASSOCIATION_RESPONSE messages can include bearer-related information. In a numeric model, the Host Information IE and DN_Connect-message can include bearer-related information.

Utilizing other protocols, such as UPnP, to send bearer-related information avoids changes to specifications. If such protocols are used, then common middleware or protocols must also be used to transfer needed information, and these items also need to be specified. However, this option may be particularly beneficial as it requires common agreement only in one forum (e.g. DLNA).

The required security related information is heavily dependant upon the selected association model, the trust level, and in which phase the information is passed. It is generally assumed that, once a secure connection has been established in one bearer, the two devices share a secret. With the present invention, it is possible to use the same secret to derive keys for other bearers which the two devices have in common. One method for implementing such a system involves explicit key derivation. In this system, keys to secure the new bearer can be derived from an already agreed upon shared key in the old bearer. Standard key derivation procedures, such as those approved by NIST can be used for this purpose. This requires that security in the first connection be sufficiently high that other bearers can trust that the connection was made in secure way, and that security keys can be safely derived. For example, in a WLAN situation, a PIN code entry (or using a password phrase) is secure enough, but using a push button method is not sufficiently secure. In the WUSB case, all current methods are acceptable, as is the case with WiNet. In Bluetooth, a PIN code entry is sufficiently secure when Bluetooth pairing is used and the user has indicated that the peer device is trusted, but any Bluetooth pairing methods that rely only upon user acceptance for authentication, or have no authentication at all, are not secure enough. Therefore, if a secure connection is established without authentication, then the keys are marked as insecure, and security keys for other bearers are not derived. In this situation, connection for other bearers must be secured separately when those bearers are used.

A second method for enabling the use of the same secret to derive keys for other bearers involves using the secured bearer as an out-of-band channel. Security keys can be separately negotiated over the new bearer, but the secured old bearer can be used as a secure channel to transport information needed to secure this key negotiation (e.g., by transporting a secret key, public key(s), or checksums). UPnP or other middleware can be used in conjunction with this method. However, usages of these items have to be agreed upon separately. If bearer-related information is also conveyed using middleware, security can also be negotiated over the same middleware.

Figure 4:
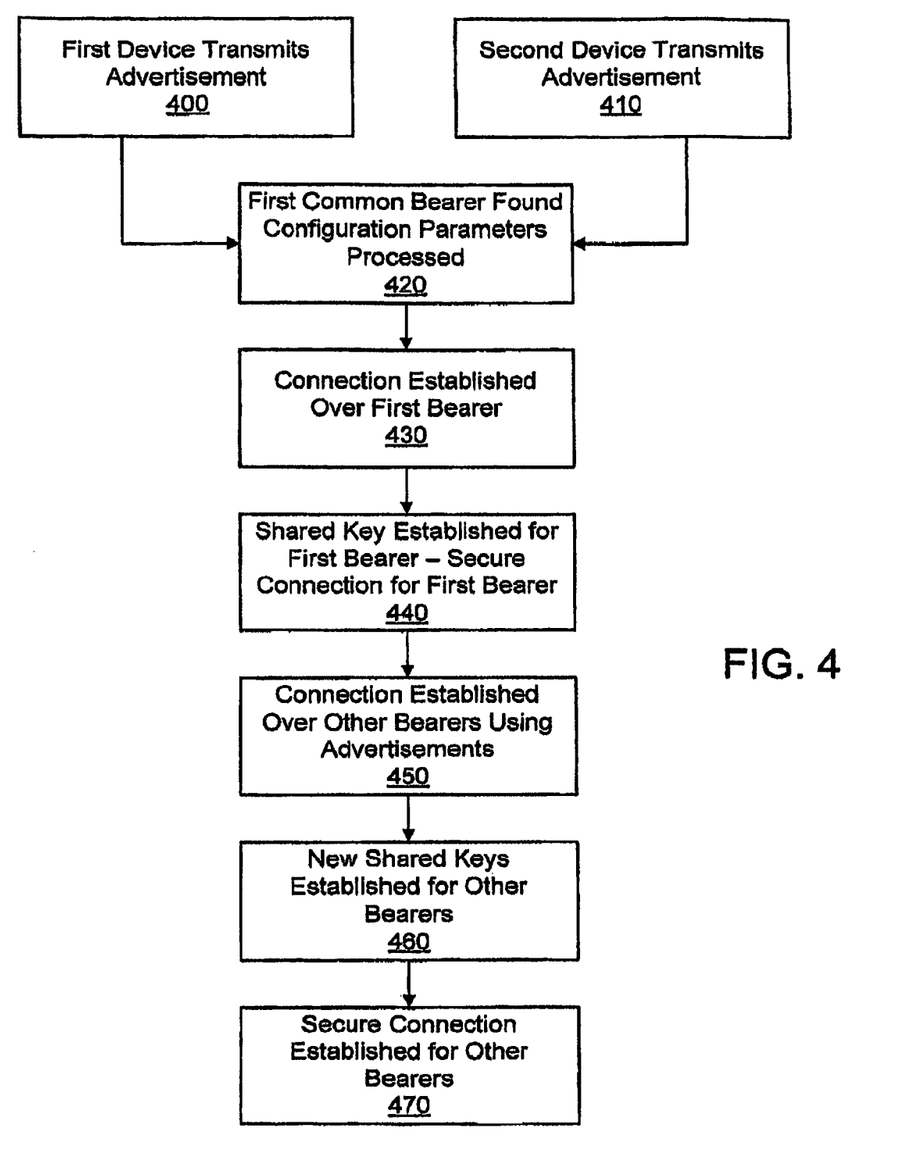
FIG. 4 is a flow chart showing the implementation of a generic embodiment of the present invention.

FIG. 4 is a flow chart showing the implementation of one general embodiment of the present invention. At step 400 in FIG. 4, a first electronic device, such as a personal computer or a mobile telephone, transmits an advertisement regarding the availability and configuration parameters all bearers that are supported by the first electronic device. The advertisement is transmitted on each of the supported bearers. At step 410, a second electronic device also transmits an advertisement regarding the availability and configuration parameters of all bearers that are supported by the second electronic device. Once again, the advertisement is transmitted on each of the supported bearers. It should be noted that the advertisements do not need to be transmitted continuously. At step 420, the first electronic device and the electronic device "find" a first common bearer between them, and the required configuration parameters are processed for that bearer. As a result, a connection is established between the first electronic device and the second electronic device at step 430. At step 440, a shared key is established for this first bearer, providing a secure connection between the first electronic device and the second electronic device. It should be noted that, if the advertisements are not transmitted continuously, then the transmission of the advertisements could begin upon the occurrence of steps 420, 430 or 440. At step 450, the first and second electronic devices use the advertisement that are being transmitted over the first bearer to establish connections over the other common bearers. At step 460, new shared keys are negotiated over the first bearer for the other common bearers. As discussed previously, these keys can be explicitly derived from the already agreed upon shared key, or they can be independently negotiated using the first bearer as a secure channel. At 470, the other bearers are secure for new transmissions between the first electronic device and the second electronic device.

The present invention also provides for an ad-hoc setup mechanism for devices supporting both Bluetooth and WLAN. Because devices normally keep WLAN radio deactivated because of power consumption issues, the device discovery and network setup initial phases of this embodiment of the present invention are carried over Bluetooth. Devices then discover if their counterparts support WLAN using Bluetooth and, if so, the IP communication channel is established over ad-hoc WLAN instead of over BNEP.

The network setup is started as a standard Bluetooth PAN ad-hoc network set-up. In one embodiment, a Bluetooth inquiry is used first to discover other networking that is enabled in nearby devices. Once the Bluetooth address(es) of the other device(s) are known, Bluetooth SDP is used to determine the supported PAN roles. In this embodiment of the invention, a new Bluetooth SDP service description is defined. This service description, can be called, for example, "ad-hoc WLAN support". This can comprise a new SDP service type, or an additional value for the PAN services. However, whichever system is used, it only needs to be a way for devices to make public their ad-hoc WLAN support.

When a device supporting WLAN is retrieving the supported PAN roles of another device using SDP, it will also check if the other device supports ad-hoc WLAN. If both devices support ad-hoc WLAN, then instead of a BNEP_SETUP_CONNECTION_REQUEST_MSG message (as defined in the Bluetooth Network Encapsulation Protocol Specification 1.0, available at www.bluetooth.org), a new message called WLAN_SETUP_CONNECTION_REQUEST_MSG will be sent. This message contains the ad-hoc WLAN network identifier (SSID) and a WEP key, and the device sending this message will immediately create such an ad-hoc network and wait for the receiver(s) of the message to join it. In order to improve the security of this solution, the WEP key is randomly generated each time a new ad-hoc connection is formed in a particular embodiment of the invention.

One option for improving security involves basing the WEP key on a Diffie Hellman exchange of public keys. In this particular situation, the AD_HOC_WLAN_CONNECTION_REQUEST message contains the Diffie Hellman public key of the connecting device, and a new message is sent from the other party. This message is referred to as the AD_HOC_WLAN_CONNECTION_RESPONSE. This message contains other party's public key. Once these public keys had been exchanged, it is possible for both sides to compute a shared secret, and this shared secret can then be used as the WEP key. The advantage of this approach is that there is no need for the WEP key itself to be sent over the insecure Bluetooth connection.

Applications and PAN user interfaces will not be affected by the fact the PAN is based on ad-hoc WLAN and not Bluetooth, since it is only the physical layer which changes. At the same, improved performance is obtained, particularly resulting in more bandwidth, less delay, better multicast support, and far greater range than would otherwise be possible.

One particular scenario involves when, in a network formed by three or more devices, several devices support WLAN but some do not. In this situation, one of the devices can participate in both the Bluetooth PAN and the WLAN network and forward the packets at a link layer from one network to another. This device should be the group node or the network access point.

Figure 5:
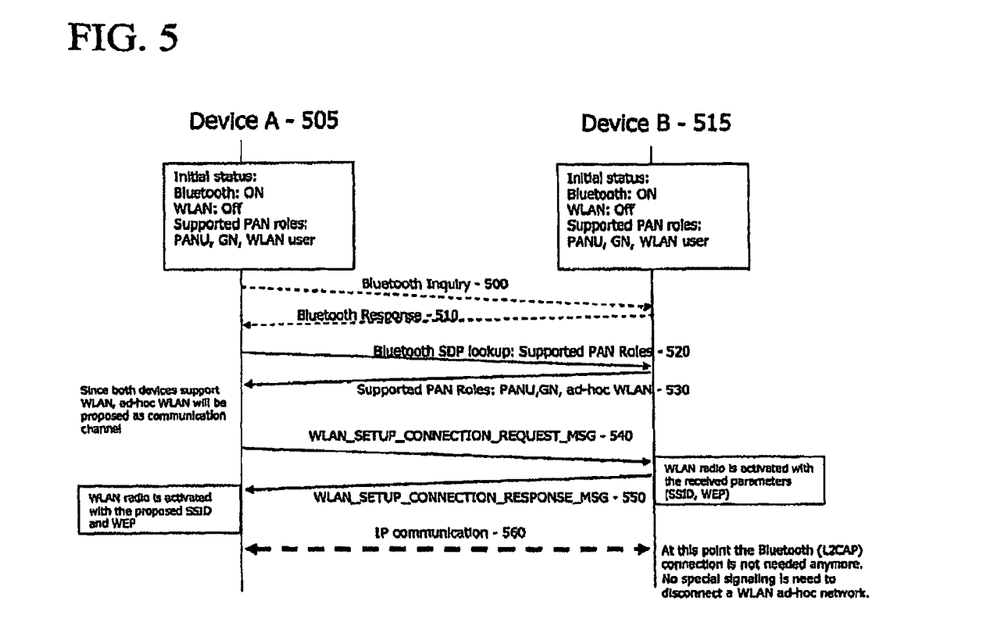
FIG. 5 is a flow diagram showing a process for forming an ad-hoc WLAN network according to one embodiment of the present invention.

FIG. 5 is a flow diagram showing the specific interactions between a Device A 505 and a Device B 515 according to this embodiment of the invention. At step 500 in FIG. 5, Device A 505 makes a Bluetooth Inquiry, in response to which Device B makes a Bluetooth response at step 510. At step 520, Device A 505 transmits a "Bluetooth SDP lookup" for supported PAN roles. In response, Device B transmits its supported PAN roles at step 530. In this situation, the supported PAN roles comprises PANO, GN, and ad-hoc WLAN. Because both devices support WLAN, ad-hoc WLAN is proposed as the communication channel. This proposal is made by Device A 505 at step 540 with the transmission of the WLAN_SETUP_CONNECTION_REQUEST_MSG. When received by Device B 515, its WLAN radio is activated with the received parameters, and Device B 515 transmits a WLAN_SETUP_CONNECTION_RESPONSE_MSG at step 550. At this point, Device A's WLAN radio is activated with the proposed SSID and WEP. Subsequently, IP communication can occur between Device A 505 and Device B 515, and the Bluetooth connection is no longer needed.

In this particular implementation of the present invention, additions may be needed to the Bluetooth Personal Area Networking Profile v 1.0 specification (Feb. 14, 2003) which is incorporated herein by reference in its entirety. Potential additions are as follows:

New section 2.1.4: PAN with WLAN enabled devices. It can happen that Bluetooth PAN devices also support WLAN. In such case it is normally convenient to establish the IP communication channel over ad-hoc WLAN instead of over Bluetooth L2CAP/BNEP since the performance is much better in WLAN.

Bluetooth PAN connection setup procedure can prove to be very useful to setup also ad-hoc WLAN networks, since WLAN radios are normally off, not providing device discovery mechanisms as Bluetooth does.

New section 8.1.4 WLAN User service record. A new Bluetooth Service Discovery Protocol service record called "WLAN User service record" must be defined. Bluetooth devices supporting WLAN can advertise their WLAN capabilities through this service record. The service record should contain at least the following fields: (1) Support for Ad-hoc WLAN (Boolean); (2) Support for Infrastructure mode (Boolean); (3) WEP security support (Boolean); and (4) Optionally, the support for other WLAN security protocols and procedures can be described in this section.

New section (for example 13): WLAN link establishment. If two or more devices establishing a PAN, find through SDP that all of them support WLAN, the connection setup of the IP network can optionally be done over WLAN instead of over Bluetooth (BNEP-L2CAP), because the performance is better. The WLAN link would normally be an ad-hoc WLAN network, created on the spot, where one device proposes a network name (SSID) and security parameters to the others. It could be the case that one device is already part of an Infrastructure WLAN network, and that it "invites" other devices to join that network. In this case the WLAN network parameters would be Infrastructure instead of ad-hoc.

Furthermore, additions may also be needed to the Bluetooth Network Encapsulation Protocol (BNEP) Specification (Feb. 14, 2003) which is incorporated herein by reference in its entirety. Potential additions are as follows:

2.6.3.3 WLAN_SETUP_CONNECTION_REQUEST_MSG
BNEP Type=0x01
BNEP Control Type=0x03
Parameters:
  WLAN SSID: proposed WLAN network name
  WLAN mode: Infra/ad-hoc
  WEP Key (optional): proposed shared WEP key. Transmission of this key is only secure when devices are Bluetooth paired. It can be used to form networks with more than two devices.
  Public key (optional): Diffie Hellman algorithm can be optionally used to transmit the WEP key in a secure manner, even if devices have not paired. This requires devices to exchange the public keys. Once devices have exchanged the public keys, the WEP keys are transmitted encrypted according to the Diffie Hellman algorithm.

2.6.3.4 WLAN_SETUP_CONNECTION_RESPONSE_MSG
BNEP Type=0x01
BNEP Control Type=0x04
Parameters:
  WLAN SSID: accepted WLAN network name
  WLAN mode: Infra/ad-hoc
  WEP Key (optional): accepted shared WEP key. Transmission of this key is only secure when devices are Bluetooth paired. It can be used to form networks with more than two devices.
  Public key: If the device wants to use the Diffie Hellman algorithm to negotiate a WEP key. This is secure even if devices have not paired, but only works for 2-device networks.

The present invention is described in the general context of method steps, which may be implemented in one embodiment by a program product including computer-executable instructions, such as program code, executed by computers in networked environments.

Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represent examples of corresponding acts for implementing the functions described in such steps.

Software and web implementations of the present invention could be accomplished with standard programming techniques with rule based logic and other logic to accomplish the various database searching steps, correlation steps, comparison steps and decision steps. It should also be noted that the words "component" and "module" as used herein, and in the claims, is intended to encompass implementations using one or more lines of software code, and/or hardware implementations, and/or equipment for receiving manual inputs.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A method comprising:
    establishing, by a first electronic device, a connection with a second electronic device over a first radio technology;
    receiving, at the first electronic device, a first advertisement from the second electronic device over the first radio technology, the first advertisement including configuration parameters for a second radio technology, which is supported by the second electronic device; and
    using the configuration parameters received in the first advertisement to establish a secure connection over the second radio technology between the first and second electronic devices, wherein the first radio technology and the second radio technology are different radio technologies.

2. The method of claim 1, further comprising transmitting, from the first electronic device, a second advertisement to the second electronic device over the first radio technology, wherein the second advertisement includes configuration parameters for one or more third radio technologies, which are supported by the first electronic device, and wherein the configuration parameters transmitted in the second advertisement enable the second electronic device to establish a connection over at least one of the third radio technologies between the first and second electronic devices.

3. The method of claim 1, wherein the first radio technology and the second radio technology are each selected from a group consisting of WLAN, Bluetooth, Wireless USB, and WiNet, and wherein the first and second radio technologies are each different ones of the group.

4. The method of claim 1, further comprising:
    before establishing the secure connection over the second radio technology, establishing a first shared key to enable secure transmissions over the first radio technology; and
    using the first shared key to derive one or more additional shared keys for enabling secure transmissions over the second radio technology.

5. The method of claim 1, further comprising:
    before establishing the secure connection over the second radio technology, establishing a first shared key to enable secure transmissions over the first radio technology; and
    using the connection over the first radio technology as an out-of-band channel to establish one or more additional shared keys for enabling secure transmissions over the second radio technology.

6. The method of claim 1, wherein the configuration parameters include information regarding one of supported bearers, supported association models, device identifiers, channels, and host friendly names.

7. The method of claim 1, wherein the configuration parameters include information required to enable the establishment of a WLAN connection.

8. The method of claim 1, wherein the configuration parameters include information required to enable the establishment of a WUSB connection.

9. The method of claim 1, wherein the configuration parameters include information required to enable the establishment of a WiNet connection.

10. The method of claim 1, wherein the configuration parameters include information required to enable the establishment of a Bluetooth connection.

11. A non-transitory memory having stored thereon computer program code, the non-transitory memory and computer program code configured to, with a processor, cause an apparatus to:
    establish a connection with an electronic device over a first radio technology;
    receive a first advertisement from the electronic device over the first radio technology, the first advertisement including configuration parameters for a second radio technology, which is supported by the electronic device; and
    use the configuration parameters received in the first advertisement to establish a secure connection over the second radio technology between the apparatus and the electronic device, wherein the first radio technology and the second radio technology are different radio technologies.

12. The non-transitory memory of claim 11, wherein the non-transitory memory and computer program code are further configured to, with the processor, cause the apparatus to:
    transmit a second advertisement to the electronic device over the first radio technology, wherein the second advertisement includes configuration parameters for one or more third radio technologies, which are supported by the apparatus, and wherein the configuration parameters transmitted in the second advertisement enable the electronic device to establish a connection over at least one of the third radio technologies between the apparatus and the electronic device.

13. The non-transitory memory of claim 11, wherein the non-transitory memory and computer program code are further configured to, with the processor, cause the apparatus to:
    before establishing the secure connection over the second radio technology, establish a first shared key to enable secure transmissions over the first radio technology; and
    use the first shared key to derive additional shared keys for enabling secure transmissions over the second radio technology.

14. The non-transitory memory of claim 11, wherein the non-transitory memory and computer program code are further configured to, with the processor, cause the apparatus to:
    before establishing the secure connection over the second radio technology, establish a first shared key to enable secure transmissions over the first radio technology; and
    use the connection over the first radio technology as an out-of-band channel to establish one or more additional shared keys for enabling secure transmissions over the radio technology.

15. The non-transitory memory of claim 11, wherein the configuration parameters include information regarding one of supported bearers, supported association models, device identifiers, channels, and host friendly names.

16. The non-transitory memory of claim 11, wherein the configuration parameters include information required to enable the establishment of a WLAN connection.

17. The non-transitory memory of claim 11, wherein the configuration parameters include information required to enable the establishment of a WUSB connection.

18. The non-transitory memory of claim 11, wherein the configuration parameters include information required to enable the establishment of a WiNet connection.

19. The non-transitory memory of claim 11, wherein the configuration parameters include information required to enable the establishment of a Bluetooth connection.

20. An apparatus, comprising:
a processor; and
a memory including computer program code, the memory and the computer program code configured to, with the processor, cause the apparatus to:
establish a connection with an electronic device over a first radio technology;
receive a first advertisement from the electronic device over the first radio technology, the first advertisement including configuration parameters for a second radio technology, which is supported by the electronic device; and
use the configuration parameters received in the first advertisement to establish a secure connection over the second radio technology between the apparatus and the electronic device, wherein the first radio technology and the second radio technology are different radio technologies.

21. The apparatus of claim 20, wherein the memory and computer program code are further configured to, with the processor, cause the apparatus to transmit a second advertisement to the electronic device over the first radio technology, wherein the second advertisement includes configuration parameters for one or more third radio technologies, which are supported by the apparatus, and wherein the configuration parameters transmitted in the second advertisement enable the electronic device to establish a connection over at least one of the third radio technologies between the apparatus and the electronic device.

22. The apparatus of claim 20, wherein the memory and computer program code are further configured to, with the processor, cause the apparatus to:
before establishing the secure connection over the second radio technology, establish a first shared key to enable secure transmissions over the first radio technology; and
use the first shared key to derive one or more additional shared keys for enabling secure transmissions over the second radio technology.

23. The apparatus of claim 20, wherein the memory and computer program code are further configured to, with the processor, cause the apparatus to:
before establishing the secure connection over the second radio technology, establish a first shared key to enable secure transmissions over the first radio technology; and
use the connection over the first radio technology as an out-of-band channel to establish one or more additional shared keys for enabling secure transmissions over the second radio technology.

24. The apparatus of claim 20, wherein the configuration parameters include information regarding one of supported bearers, supported association models, device identifiers, channels, and host friendly names.

25. The apparatus of claim 20, wherein the configuration parameters include information required to enable the establishment of a WLAN connection.

26. The apparatus of claim 20, wherein the configuration parameters include information required to enable the establishment of a WUSB connection.

27. The apparatus of claim 20, wherein the configuration parameters include information required to enable the establishment of a WiNet connection.

28. The apparatus of claim 20, wherein the configuration parameters include information required to enable the establishment of a Bluetooth connection.

* * * * *

UNITED STATES PATENT AND TRADEMARK OFFICE
CERTIFICATE OF CORRECTION

PATENT NO. : 8,484,466 B2 Page 1 of 1
APPLICATION NO. : 11/575967
DATED : July 9, 2013
INVENTOR(S) : Marin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1256 days.

Signed and Sealed this
Eighth Day of September, 2015

Michelle K. Lee
*Director of the United States Patent and Trademark Office*